(12) United States Patent
Yang et al.

(10) Patent No.: US 11,417,258 B2
(45) Date of Patent: Aug. 16, 2022

(54) DRIVE MODULE, VOLTAGE GENERATION METHOD THEREOF AND DISPLAY DEVICE

(71) Applicant: WUHAN TIANMA MICRO-ELECTRONICS CO., LTD., Wuhan (CN)

(72) Inventors: Yang Yang, Shanghai (CN); Xiangzi Kong, Shanghai (CN); Bojia Lv, Shanghai (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 17/210,783

(22) Filed: Mar. 24, 2021

(65) Prior Publication Data
US 2022/0189362 A1  Jun. 16, 2022

(30) Foreign Application Priority Data
Dec. 11, 2020  (CN) .............................. 202011463499

(51) Int. Cl.
*G09G 3/20* (2006.01)
*G06F 1/28* (2006.01)

(52) U.S. Cl.
CPC ................ *G09G 3/20* (2013.01); *G06F 1/28* (2013.01); *G09G 2330/028* (2013.01)

(58) Field of Classification Search
CPC ....... G09G 3/20; G09G 2330/028; G06F 1/28
See application file for complete search history.

(56) References Cited

U.S. PATENT DOCUMENTS

| 2009/0085538 | A1* | 4/2009 | Miguchi | .................. | H02M 3/07 |
| | | | | | 323/273 |
| 2009/0109147 | A1* | 4/2009 | Park | ..................... | G09G 3/3233 |
| | | | | | 345/76 |
| 2021/0090506 | A1* | 3/2021 | Kim | ......................... | G09G 3/20 |

FOREIGN PATENT DOCUMENTS

CN            110189674 A        8/2019

* cited by examiner

*Primary Examiner* — Mihir K Rayan
(74) *Attorney, Agent, or Firm* — von Briesen & Roper, s.c.

(57) ABSTRACT

Provided is a drive module. A main control unit in the drive module is configured to determine, according to the output voltage of the electrical energy storage unit, an optimal analog reference voltage output efficiency value of a power supply chip, determine, according to the output voltage of the electrical energy storage unit and the optimal analog reference voltage output efficiency value of the power supply chip, a voltage value of an analog reference voltage, and generate, according to the voltage value of the analog reference voltage, a control instruction corresponding to pulse signal information. A pulse signal generation unit is configured to generate a corresponding pulse signal according to the control instruction. An analog reference voltage unit in the power supply chip is configured to receive an electrical signal output by the electrical energy storage unit, and generate, according to the pulse signal, a corresponding analog reference voltage signal.

20 Claims, 11 Drawing Sheets

DRIVE MODULE, VOLTAGE GENERATION METHOD THEREOF AND DISPLAY DEVICE

CROSS-REFERENCE TO RELATED APPLICATION

This application claims priority to Chinese Patent Application No. 202011463499.1 filed Dec. 11, 2020, the disclosure of which is incorporated herein by reference in its entirety.

TECHNICAL FIELD

The present disclosure relates to the field of display technologies and, in particular, to a drive module, a voltage generation method thereof, and a display device.

BACKGROUND

An organic light emitting display device is a self-luminous device, which has advantages of low power consumption, short response time, high luminous efficiency, high brightness and wide viewing angle, and is favored by users.

A conventional organic light emitting display device includes a battery, a power supply chip, a drive chip and a display panel. The battery provides electrical energy for the power supply chip, the power supply chip provides a power supply signal for the drive chip and the display panel, and the drive chip provides a drive signal for the display panel. More specifically, the power supply signal provided by the power supply chip for the drive chip is an analog reference voltage, and the analog reference voltage is related to a pulse signal generated by the drive chip. In the existing art, the pulse signal generated by the drive chip controls the analog reference voltage output by the power supply chip to be a fixed voltage. With electricity quantity decreasing, an output efficiency of the power supply chip continuously changes and cannot be maintained at about the optimal analog reference voltage output efficiency value, resulting in an increase of electricity loss.

SUMMARY

The present disclosure provides a drive module, a voltage generation method thereof and a display device, so that an analog reference voltage output efficiency of a power supply chip is maintained at about an optimal analog reference voltage output efficiency value, and the electricity loss is effectively reduced.

In a first aspect, the present disclosure provides a drive module, which includes: an electrical energy storage unit, an electricity quantity detection unit, a drive chip and a power supply chip.

The electrical energy storage unit is configured to supply power.

The electricity quantity detection unit is connected to the electrical energy storage unit and is configured to detect an output voltage of the electrical energy storage unit in real time.

The drive chip includes a main control unit and a pulse signal generation unit. The electricity quantity detection unit, the main control unit and the pulse signal generation unit are sequentially connected. The main control unit is configured to determine, according to the output voltage of the electrical energy storage unit, an optimal analog reference voltage output efficiency value of a power supply chip, determine, according to the output voltage of the electrical energy storage unit and the optimal analog reference voltage output efficiency value of the power supply chip, a voltage value of an analog reference voltage and generate, according to the voltage value of the analog reference voltage, a control instruction including corresponding pulse signal information. The pulse signal generation unit is configured to generate a corresponding pulse signal according to the control instruction.

The power supply chip includes an analog reference voltage unit. The analog reference voltage unit, the pulse signal generation unit and the electrical energy storage unit are connected. The analog reference voltage unit is configured to receive an electrical signal output by the electrical energy storage unit, generate, according to the pulse signal, a corresponding analog reference voltage signal, and output the analog reference voltage signal to the drive chip.

In a second aspect, the present disclosure provides a display device including the drive module described in the first aspect.

In a third aspect, the present disclosure further provides a voltage generation method of a drive module. The method includes the steps described blow.

An electricity quantity detection unit detects an output voltage of an electrical energy storage unit in real time.

A main control unit in a drive chip determines, according to the output voltage of the electrical energy storage unit, an optimal analog reference voltage output efficiency value of a power supply chip; determines, according to the output voltage of the electrical energy storage unit and the optimal analog reference voltage output efficiency value of the power supply chip, a voltage value of an analog reference voltage; and generates, according to the voltage value of the analog reference voltage, a control instruction including corresponding pulse signal information.

A pulse signal generation unit generates a corresponding pulse signal according to the control instruction.

An analog reference voltage unit in the power supply chip receives an electrical signal output by the electrical energy storage unit, generates, according to the pulse signal, a corresponding analog reference voltage signal, and outputs the analog reference voltage signal to the drive chip.

DETAILED DESCRIPTION

Figure 1:
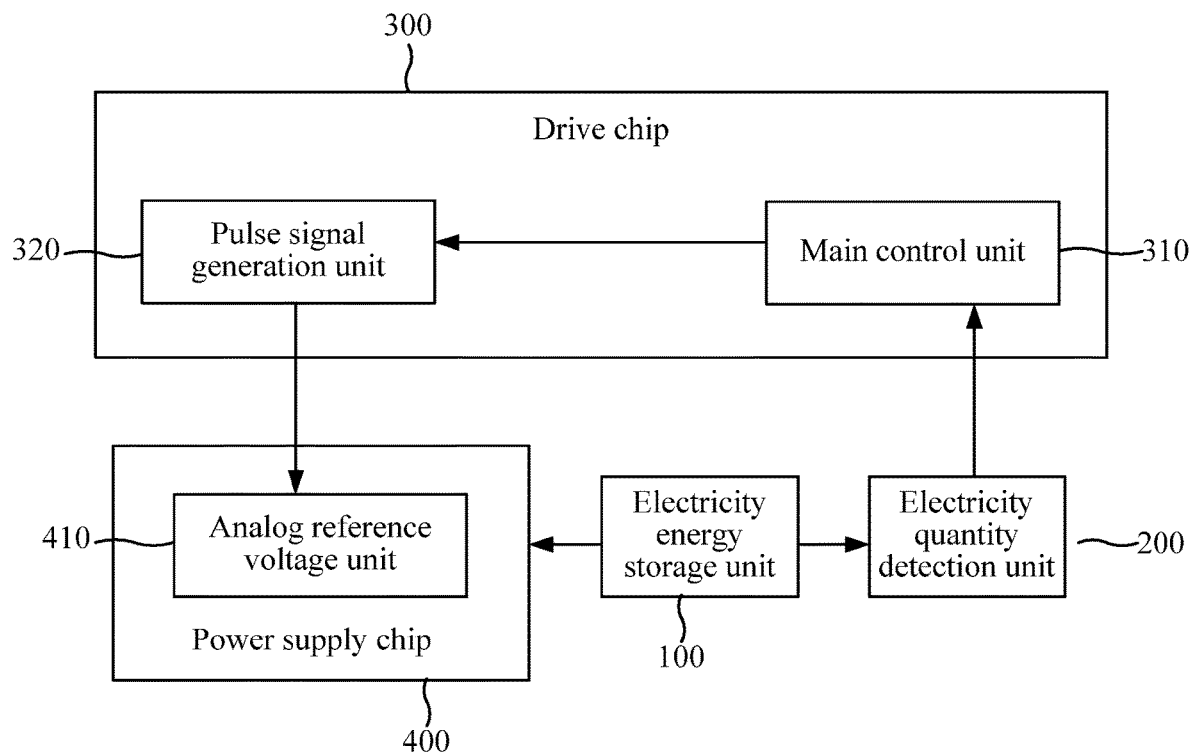
FIG. 1 is a structural diagram of a drive module provided by an embodiment of the present disclosure.

To elucidate technical means and technical effects for achieving an intended purpose of the present disclosure, implementations, structures, features and effects of a drive module and a voltage generation method thereof, and a display device according to the present disclosure are described hereinafter in detail with reference to the drawings and preferred embodiments.

An embodiment of the present disclosure provides a drive module. The drive module includes an electrical energy storage unit, an electricity quantity detection unit, a drive chip and a power supply chip.

The electrical energy storage unit is configured to supply power.

The electricity quantity detection unit is connected to the electrical energy storage unit and is configured to detect an output voltage of the electrical energy storage unit in real time.

The drive chip includes a main control unit and a pulse signal generation unit. The electricity quantity detection unit, the main control unit and the pulse signal generation unit are sequentially connected. The main control unit is configured to: determine, according to the output voltage of the electrical energy storage unit, an optimal analog reference voltage output efficiency value of the power supply chip; determine, according to the output voltage of the electrical energy storage unit and the optimal analog reference voltage output efficiency value of the power supply chip, a voltage value of an analog reference voltage; and generate, according to the voltage value of the analog reference voltage, a control instruction including corresponding pulse signal information. The pulse signal generation unit is configured to generate a corresponding pulse signal according to the control instruction.

The power supply chip includes an analog reference voltage unit. The analog reference voltage unit is connected to the pulse signal generation unit and the electrical energy storage unit. The analog reference voltage unit is configured to: receive an electrical signal output by the electrical energy storage unit; generate, according to the pulse signal, a corresponding analog reference voltage signal; and output the analog reference voltage signal to the drive chip.

The drive module provided by the embodiment of the present disclosure includes the electrical energy storage unit, the electricity quantity detection unit, the drive chip and the power supply chip. The electricity quantity detection unit is configured to detect an output voltage of the electrical energy storage unit in real time. The main control in the drive chip is configured to: determine, according to the output voltage of the electrical energy storage unit, an optimal analog reference voltage output efficiency value of a power supply chip; determine, according to the output voltage of the electrical energy storage unit and the optimal analog reference voltage output efficiency value of the power supply chip, a voltage value of an analog reference voltage; and generate, according to the voltage value of the analog reference voltage, a control instruction including corresponding pulse signal information. The pulse signal generation unit is configured to generate a corresponding pulse signal according to the control instruction. The analog reference voltage unit in the power supply chip is configured to: receive an electrical signal output by the electrical energy storage unit; generate, according to the pulse signal, a corresponding analog reference voltage signal; and output the analog reference voltage signal to the drive chip. In this manner, the analog reference voltage output by the power supply chip can be adjusted in real time according to the output voltage of the electrical energy storage unit, the dynamic change of the analog reference voltage is achieved, the analog reference voltage output efficiency of the power supply chip is maintained at about the optimal output efficiency value of the analog reference voltage, and the electricity loss is effectively reduced.

The above is the core idea of the present application. Technical solutions in embodiments of the present disclosure are described clearly and completely below in conjunction with the drawings in the embodiments of the present disclosure. Apparently, the embodiments described below are part, not all, of the embodiments of the present disclosure. Based on the embodiments of the present disclosure, all other embodiments obtained by those of ordinary skill in the art without creative work are within the scope of the present disclosure.

Details are set forth below to facilitate a thorough understanding of the present disclosure. However, the present disclosure may also be implemented by other embodiments different from the embodiments described herein, and those skilled in the art may make similar generalizations without departing from the intention of the present disclosure. Therefore, the present disclosure is not limited to the embodiments below.

Additionally, the present disclosure is described in detail in conjunction with the drawings. In the detailed description of embodiments of the present disclosure, for ease of description, schematic views illustrating structures of devices and components are not partially enlarged to a general proportional scale. The schematic views are merely illustrative and are not intended to limit the scope of the present disclosure. Additionally, actual manufacturing includes three-dimensional spatial sizes: length, width and height.

Table 1 shows relevant relationship data of a battery remaining electricity quantity, an analog reference voltage and an analog reference voltage output efficiency of the power supply chip in the related art. As shown in Table 1, as the battery remaining electricity quantity gradually decreases from 100% to 0%, an output voltage VBAT of a battery drops from 4.20 V to 3.00 V. For a case where an analog reference voltage VCI is fixed at 2.8 V, the output voltage VBAT of the battery is larger than the analog reference voltage VCI at any time, and the power supplied by the battery to the power supply chip (Power IC) is sufficient to enable the power supply chip (Power IC) to output an analog reference voltage VCI of 2.8 V without boosting the input VBAT inside the power supply chip (Power IC). In this case, the analog reference voltage output efficiency of the power supply chip (Power IC) is approximately equal to VCI/VBAT.

For a case where the analog reference voltage VCI is fixed at 3.3 V, when the output voltage of the battery is greater than 3.45 V, the output voltage VBAT of the battery is greater than the analog reference voltage VCI, and the power supplied by the battery to the power supply chip (Power IC) is sufficient to enable the power supply chip (Power IC) to output an analog reference voltage VCI of 3.3 V without boosting the input VBAT inside the power supply chip (Power IC). In this case, the analog reference voltage output efficiency of the power supply chip (Power IC) is approximately equal to VCI/VBAT. When the output voltage VBAT of the battery is 3.45 V or 3.00 V, the power supplied by the battery to the power supply chip (Power IC) is not sufficient to enable the power supply chip (Power IC) to output an analog reference voltage VCI of 3.3 V, and thus the input VBAT needs to be boosted inside the power supply chip (Power IC). In this case, the analog reference voltage output efficiency of the power supply chip (Power IC) in an IDLE state is fixed at 50%, and the analog reference voltage output efficiency of the power supply chip (Power IC) in a NORMAL state is fixed at 80%. Based on the above analysis, the analog reference voltage output efficiency of the power supply chip (Power IC) under different battery remaining electricity quantities can be calculated and obtained in the case where the analog reference voltage VCI is fixed at 2.8 V and 3.3 V, as shown in Table 1.

It can be seen from Table 1 that in the case where the analog reference voltage VCI is fixed at 2.8 V, the analog reference voltage output efficiency of the power supply chip (Power IC) increases with the decreasing of the battery electricity quantity. In the case where the analog reference voltage VCI is fixed at 3.3 V and the input VBAT does not need to be boosted inside the power supply chip (Power IC), the output efficiency of the power supply chip (Power IC) increases with the decreasing of the batter electricity quantity. That is, in the above two cases, the analog reference voltage output efficiency of the power supply chip (Power IC) cannot be maintained at about the optimal output efficiency value, causing the output efficiency of the power supply chip (Power IC) to be relatively small, and a large amount of electrical energy to be converted into heat energy and lost, thus causing a large electricity loss.

To solve the above problem, an embodiment of the present disclosure provides a drive module. The analog reference voltage is configured to be dynamically varied with the battery remaining electricity quantity, so that the output efficiency of the power supply chip is maintained at about the optimal output efficiency value, reducing the amount of electric energy converted into heat energy and reducing the electricity loss.

Specifically, FIG. 1 is a structural diagram of a drive module provided by an embodiment of the present disclosure. As shown in FIG. 1, the drive module includes an electrical energy storage unit 100, an electricity quantity detection unit 200, a drive chip 300 and a power supply chip 400.

The electrical energy storage unit 100 is configured to supply power. The electricity quantity detection unit 200 is connected to the electrical energy storage unit 100 and is configured to detect an output voltage of the electrical energy storage unit 100 in real time. The drive chip 300 includes a main control unit 310 and a pulse signal generation unit 320. The electricity quantity detection unit 200, the main control unit 310 and the pulse signal generation unit 320 are sequentially connected. The main control unit 310 is configured to: determine, according to the output voltage of the electrical energy storage unit 100, an optimal analog reference voltage output efficiency value of the power supply chip 400; determine, according to the output voltage of the electrical energy storage unit 100 and the optimal analog reference voltage output efficiency value of the power supply chip 400, a voltage value of an analog reference voltage; and generate, according to the voltage value of the analog reference voltage, a control instruction including corresponding pulse signal information. The pulse signal generation unit 320 is configured to generate a corresponding pulse signal according to the control instruction.

The power supply chip 400 includes an analog reference voltage unit 410. The analog reference voltage unit 410 is connected to the pulse signal generation unit 320 and the electrical energy storage unit 100. The analog reference voltage unit 410 is configured to: receive an electrical signal output by the electrical energy storage unit 100; generate, according to the pulse signal, a corresponding analog reference voltage signal; and output the analog reference voltage signal to the drive chip 300.

It should be noted that the electrical energy storage unit 100 may be in any structure having an electrical energy storage function, and for example, may be a battery having good energy storage characteristics and low cost.

It should be noted that the analog reference voltage unit 410 in the power supply chip 400 receives the output voltage VBAT of the electrical energy storage unit 100 detected by

TABLE 1

| Battery remaining electricity quantity | Battery output voltage VBAT | VCI is fixed to be 2.8 V | VCI output efficiency of Power IC | VCI is fixed to be 3.3 V | VCI output efficiency of Power IC |
|---|---|---|---|---|---|
| 100% | 4.20 V | There is no need to boost the VBAT input into the power supply chip, and the analog reference voltage output efficiency of the power supply chip is approximately equal to VCI/VBAT | 66.67% | There is no need to boost the VBAT input into the power supply chip, and the analog reference voltage output efficiency of the power supply chip is approximately equal to VCI/VBAT | 78.57% |
| 90% | 4.06 V | | 68.97% | | 81.28% |
| 80% | 3.98 V | | 70.35% | | 82.91% |
| 70% | 3.92 V | | 71.43% | | 84.18% |
| 60% | 3.87 V | | 72.35% | | 85.27% |
| 50% | 3.82 V | | 73.30% | | 86.39% |
| 40% | 3.79 V | | 73.88% | | 87.07% |
| 30% | 3.77 V | | 74.27% | | 87.53% |
| 20% | 3.74 V | | 74.87% | | 88.24% |
| 10% | 3.68 V | | 76.09% | | 89.67% |
| 5% | 3.45 V | | 81.16% | The VBAT input into the power supply chip needs to be boosted | IDLE: 50% Normal: 80% |
| 0% | 3.00 V | | 93.33% | | IDLE: 50% Normal: 80% | the electricity quantity detection unit 200, converts, under the modulation of the pulse signal SWIRE, the VBAT into an analog reference voltage signal VCI, and output the VCI. It is to be noted that, in this embodiment, the VCI dynamically changes according to the output voltage of the electrical energy storage unit 100, and thus the VBAT is sufficient to enable the power supply chip 400 to output a corresponding VCI at any time. Therefore, regardless of the output voltage of the electrical energy storage unit 100, there is no need to boost the VBAT inside the power supply chip 400, and an analog reference voltage output efficiency P of the power supply chip 400 is fixed and satisfies P=VCI/VBAT. There is a one-to-one correspondence between the VBAT and the remaining electricity quantity of the electrical energy storage unit 100. For example, when the remaining electricity quantity of the electrical energy storage unit 100 is 100%, the VBAT is 4.20 V. When the remaining electricity quantity of the electrical energy storage unit 100 is 90%, the VBAT is 4.06 V. Therefore, in the present application, it is essentially that the analog reference voltage signal output by the power supply chip 400 is dynamically adjusted based on the remaining electricity quantity of the electrical energy storage unit 100.

It is to be understood that, from the above calculation formula of P, if P needs to be maintained at the optimal analog reference voltage efficiency value at any time, it is necessary to maintain the ratio of VCI to VBAT to be fixed at the optimal analog reference voltage efficiency value of P at any time. There is a one-to-one correspondence between the optimal analog reference voltage efficiency value of P and the remaining electricity quantity of the electrical energy storage unit 100, and then, there is a one-to-one correspondence between the optimal analog reference voltage efficiency value of P and the VBAT. In this case, the correspondence between the optimal analog reference voltage efficiency value of P and the VBAT may be stored in the main control unit 310 of the drive chip 300, for example, stored in a first relation table in the form of a table. After the main control unit 310 receives the VBAT detected by the electrical quantity detection unit 310, a search may be performed in the first relational table based on the current VBAT to obtain a corresponding value of the optimal analog reference voltage efficiency value of P, and then according to P=VCI/VBAT, a calculation is performed to obtain a value of the VCI. This value is the value of VCI to be output when the P of the power supply chip 400 is maintained at the optimal analog reference voltage efficiency value under the current remaining electricity quantity of the electrical energy storage unit 100. For ease of description, the value of the VCI is denoted as a first value.

The output value of the VCI is modulated by the SWIRE. Therefore, to enable the power supply chip 400 to finally output a VCI signal having the first value, a corresponding SWIRE needs to be generated. Specifically, there is a correspondence between the VCI and the pulse signal information of the SWIRE, and this correspondence is pre-stored in the main control unit 310, for example, stored in a second relation table in the form of a table. After calculating and determining the first value, the main control unit 310 may search in the second relation table based on the first value to determine the pulse signal information of the corresponding SWIRE. The pulse signal information may be, for example, a duty ratio or the number of continuous pulses. Then, the main control unit 310 generates a control instruction including the pulse signal information. The control instruction controls the pulse signal generation unit 320 to generate the corresponding SWIRE. This SWIRE is input to the analog reference voltage unit 410 in the power supply chip 400, and the analog reference voltage unit 410 converts the VBAT received by the power supply chip 400 into the VCI signal having the first value, and outputs the VCI signal to the drive chip 300.

TABLE 2

| Remaining electricity quantity of electrical energy storage unit | Output voltage VBAT of electrical energy storage unit | Analog reference voltage is fixed at 2.8 V | Analog reference voltage output efficiency 1 of Power IC | Analog reference voltage is fixed at 3.3 V | Analog reference voltage output efficiency 2 of Power IC | Analog reference voltage is/ dynamically adjusted | Analog reference voltage output efficiency 3 of Power IC |
|---|---|---|---|---|---|---|---|
| 100% | 4.20 V | There is no need to boost the VBAT input into the power supply chip, and the analog reference voltage output efficiency of the power supply chip is approximately equal to VCI/VBAT | 66.67% | There is no need to boost the VBAT input into the power supply chip, and the analog reference voltage output efficiency of the power supply chip is approximately equal to VCI/VBAT | 78.57% | 3.6 V | 85.71% ↑ |
| 90% | 4.06 V | | 68.97% | | 81.28% | 3.6 V | 88.67% ↑ |
| 80% | 3.98 V | | 70.35% | | 82.91% | 3.6 V | 90.45% ↑ |
| 70% | 3.92 V | | 71.43% | | 84.18% | 3.6 V | 91.84% ↑ |
| 60% | 3.87 V | | 72.35% | | 85.27% | 3.6 V | 93.02% ↑ |
| 50% | 3.82 V | | 73.30% | | 86.39% | 3.5 V | 91.62% ↑ |
| 40% | 3.79 V | | 73.88% | | 87.07% | 3.5 V | 92.35% ↑ |
| 30% | 3.77 V | | 74.27% | | 87.53% | 3.4 V | 90.19% ↑ |
| 20% | 3.74 V | | 74.87% | | 88.24% | 3.4 V | 90.91% ↑ |
| 10% | 3.68 V | | 76.09% | | 89.67% | 3.3 V | 89.67% = |
| 5% | 3.45 V | | 81.16% | The VBAT input into the power supply chip needs to be boosted | | IDLE: 50% Normal: 80% | 3.1 V | 89.86% ↑ |
| 0% | 3.00 V | | 93.33% | | IDLE: 50% Normal: 80% | 2.8 V | 93.33% = |

It is to be noted that, affected by uncontrollable errors in actual working process, the analog reference voltage output efficiency of the drive chip 400 obtained in this embodiment fluctuates within a small range around the optimal efficiency value.

Exemplarily, Table 2 is a comparison table of an analog reference voltage output efficiency provided by an embodiment of the present disclosure. The analog reference voltage output efficiency 1 of the power supply chip is the analog reference voltage output efficiency of the power supply chip in the case where the analog reference voltage is fixed at 2.8 V in the related art. The analog reference voltage output efficiency 2 of the power supply chip is the analog reference voltage output efficiency of the power supply chip in the case where the analog reference voltage is fixed at 3.3 V in the related art. The analog reference voltage output efficiency 3 of the power supply chip is the analog reference voltage output efficiency of the power supply chip in the case where the analog reference voltage dynamically changes according to the output voltage of the electrical energy storage unit in the embodiment of the present disclosure. As shown in Table 2, in this embodiment, the analog reference voltage output efficiencies of the power supply chip under different output voltages of the electrical energy storage unit have a relatively small difference and are maintained at about the optimal efficiency value. Compared with the solution in which the analog reference voltage is fixed in the related art, in this embodiment, the analog reference voltage output efficiencies of the power supply chip under the different output voltages of the electrical energy storage unit are all larger than corresponding ones in the related art, except that several ones of the analog reference voltage output efficiencies are equal to corresponding ones in the related art, which indicates that the solution of this embodiment can effectively improve the analog reference voltage output efficiency of the power supply chip, thereby improving the overall output efficiency of the power supply chip and reducing the electricity loss and power consumption.

Figure 2:
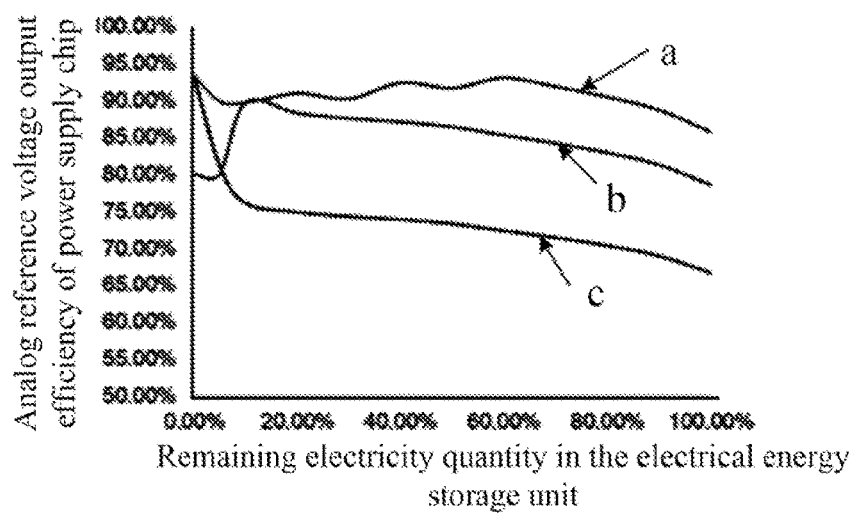
FIG. 2 is a graph of an analog reference voltage output efficiency of a power supply chip as a function of a remaining electricity quantity of an electrical energy storage unit provided by an embodiment of the present disclosure.

More intuitively, FIG. 2 is a graph of an analog reference voltage output efficiency of the power supply chip as a function of a remaining electricity quantity of the electrical energy storage unit provided by an embodiment of the present disclosure. In FIG. 2, Curve a corresponds to the solution in which the analog reference voltage dynamically changes with the remaining electricity quantity of the power storage unit provided by this embodiment. Curve b corresponds to the solution in which the analog reference voltage is fixed at 3.3 V in the related art, and Curve c corresponds to the solution in which the analog reference voltage is fixed at 2.8 V in the related art. As shown in FIG. 2, under any remaining electricity quantity of the electrical energy storage unit, the analog reference voltage output efficiency of the power supply chip corresponding to Curve a is greater than that corresponding to Curve b or Curve c, which further indicates that the solution of this embodiment can effectively improve the analog reference voltage output efficiency of the power supply chip, and then improve the overall output efficiency of the power supply chip, thereby reducing the electricity loss and power consumption.

The drive module provided by this embodiment includes the electrical energy storage unit, the electricity quantity detection unit, the drive chip and the power supply chip. The electricity quantity detection unit is configured to detect the remaining electricity quantity of the electrical energy storage unit in real time. The main control in the drive chip is configured to determine; according to the remaining electricity quantity of the electrical energy storage unit, the optimal output efficiency value of the power supply chip; determine, according to the remaining electricity quantity of the electrical energy storage unit and the optimal output efficiency value of the power supply chip, the voltage value of the analog reference voltage; and generate, according to the voltage value of the analog reference voltage, a control instruction including corresponding pulse signal information. The pulse signal generation unit is configured to generate, according to the control instruction, the corresponding pulse signal. The analog reference voltage unit in the power supply chip is configured to: receive the electrical signal output by the electrical energy storage unit; generate, according to the pulse signal, the corresponding analog reference voltage signal; and output the analog reference voltage signal to the drive chip, so that the analog reference voltage can be adjusted in real time according to the remaining electricity quantity of the electrical energy storage unit, the dynamic change of the analog reference voltage is achieved, the output efficiency of the power supply chip is maintained at about the optimal output efficiency value, and the electricity loss is effectively reduced.

Figure 3:
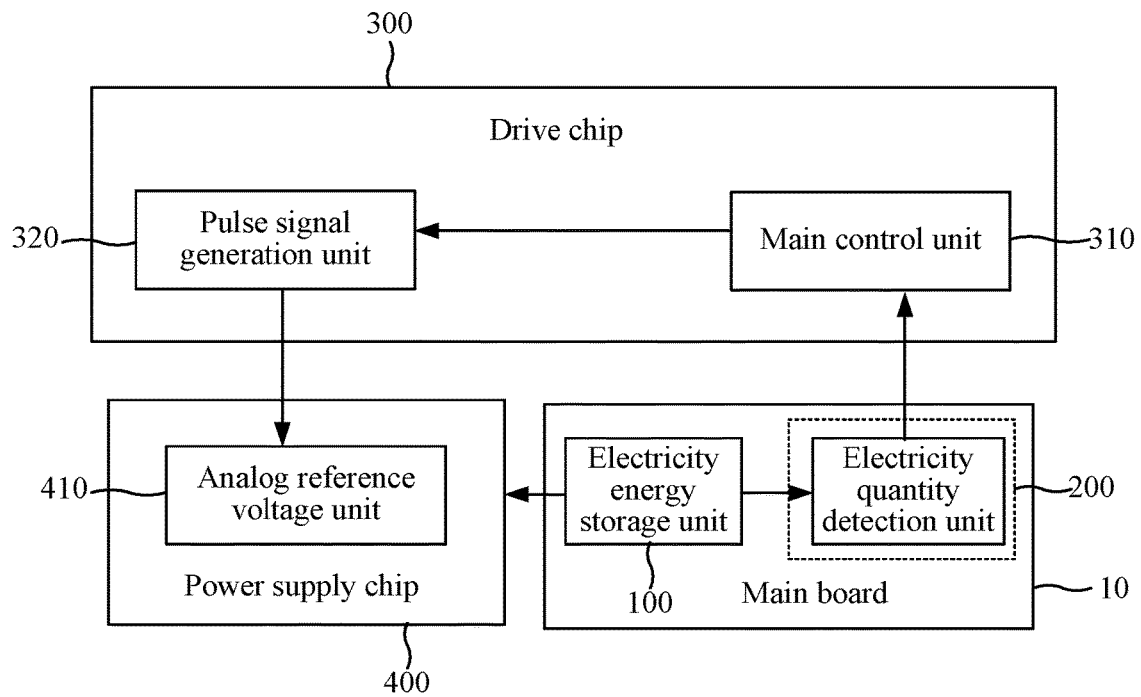
FIG. 3 is a partial structural diagram of a display device provided by an embodiment of the present disclosure.

FIG. 3 is a partial structural diagram of a display device provided by an embodiment of the present disclosure. As shown in FIG. 3, the display device includes a main board 10, and optionally, the electricity quantity detection unit 200 may be an electricity quantity detection chip, and both the electricity quantity detection chip and an electricity energy storage unit 100 is located on the main board 10.

In this embodiment, the specific type of the electricity quantity detection chip is not limited, and any chip capable of detecting the output voltage of the electricity quantity storage unit 100 are within the protection scope of the present embodiment.

It is to be noted that the electricity power detection chip is a finished component that can be purchased directly, The electricity power detection chip with a suitable type may be selected according to needs, and then the electricity power detection chip can be directly electrically connected to the electricity power storage unit 100 and the main control unit 310 in the drive module, which is convenient and quick.

Figure 4:
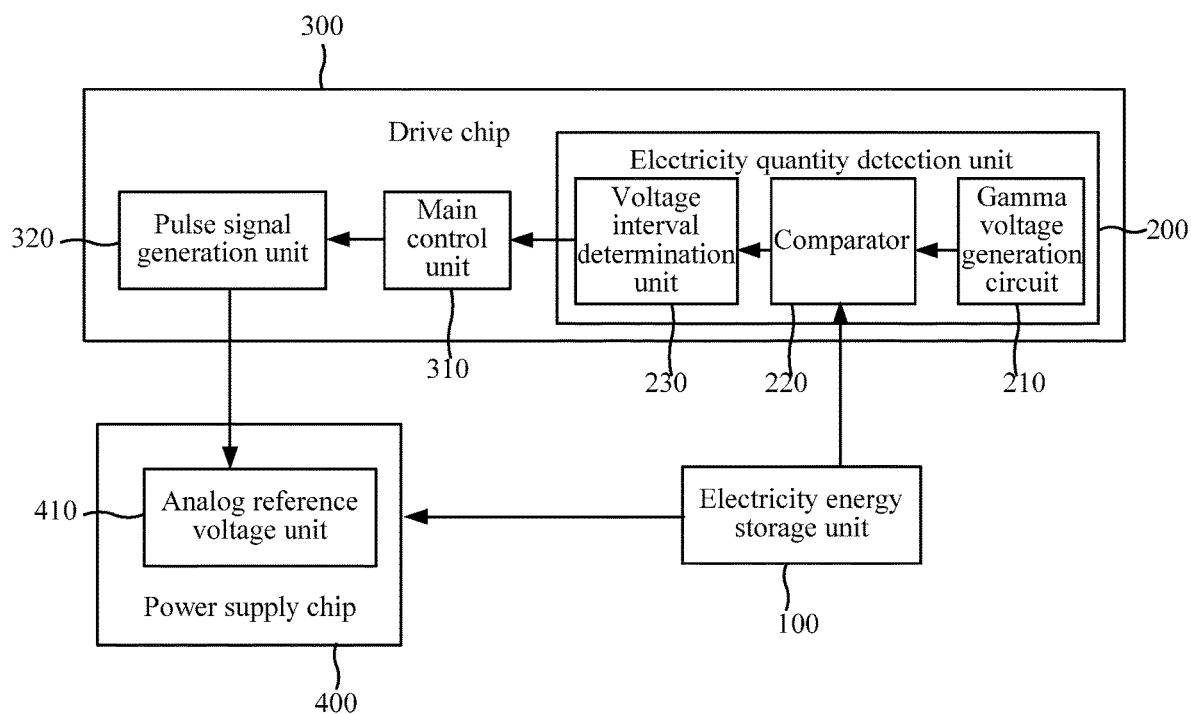
FIG. 4 is a structural diagram of another drive module provided by an embodiment of the present disclosure.

FIG. 4 is a structural diagram of another drive module provided by an embodiment of the present disclosure. As shown in FIG. 4, the electricity quantity detection unit 200 may include a gamma voltage generation circuit 210, a comparator 220 and a voltage interval determination unit 230 which are sequentially connected, the gamma voltage generation circuit 210 is configured to provide a plurality of dynamically changing voltage signals in real time, the comparator is configured to compare the voltage signals with an output voltage of the electrical energy storage unit 100 in real time, and the voltage interval determination unit 230 is configured to output the output voltage of the electrical energy storage unit 100. The output voltage of the electrical energy storage unit 100 is between two of the voltage signals corresponding to adjacent two different output values of the comparator. The gamma voltage generation circuit 210, the comparator 220 and the voltage interval determination unit 230 are all disposed in the drive chip 300.

Specifically, the comparator 220 includes a first signal input end and a second signal input end. The first signal input end receives a voltage signal provided by the gamma voltage generation circuit 210, the second signal input end receives an output voltage of the electrical energy storage unit, and the comparator 220 has two and only two different output signals according to a magnitude relationship between the voltage signal received by the first signal input end and the voltage signal received by the second signal input end. Exemplarily, in a case where the magnitude of the voltage signal received by the first signal input end is less than the magnitude of the voltage signal received by the second signal input end, the comparator 220 outputs 1. In a case where the magnitude of the voltage signal received by the first signal input end is greater than the magnitude of the voltage signal received by the second signal input end, the comparator 220 outputs 0.

Specifically, multiple dynamically changing voltage signals provided by the gamma voltage generation circuit 210 in real time gradually increase or decrease in magnitude. For example, multiple dynamically changing voltage signals provided by the gamma voltage generation circuit 210 in real time are 1 V, 2 V, 3 V, 4 V and 5 V sequentially. A current output voltage of the electrical energy storage unit 100 is, for example, 3.5 V. In a case where the comparator 210 receives the voltage signals of 1 V, 2 V and 3 V provided by the gamma voltage generation circuit 210, the comparator 210 continuously outputs 1. In a case where the comparator 210 receives the voltage signal of 4 V provided by the gamma voltage generation circuit 210, the comparator 210 outputs 0, and at this time, the two adjacent output values of the comparator 210 are different. The voltage interval determination unit 230 determines that the output voltage of the electrical energy storage unit 100 is between the voltage signals of 3 V and 4 V corresponding to the two different output values, and selects a voltage signal between 3 V and 4 V as the output voltage of the electrical energy storage unit 100, such as selecting an intermediate voltage of 3.5 V between 3 V and 4 V. It is to be understood that the above exemplary voltage values merely specify the specific working method of the electrical quantity detection unit 200. In the actual working process, a difference between adjacent ones of the multiple voltage signals provided by the gamma voltage generation circuit 210 is extremely small, and the clamped output voltage of the electrical energy storage unit 100 is also very accurate.

It is to be noted that the electrical quantity detection unit 200 in FIG. 4 can accurately detect the output voltage of the electrical quantity storage unit 100, and is disposed inside the drive chip to achieve the electrical connection during the installation process of the drive chip, thus improving the integration level and simplifying the installation process.

Figure 5:
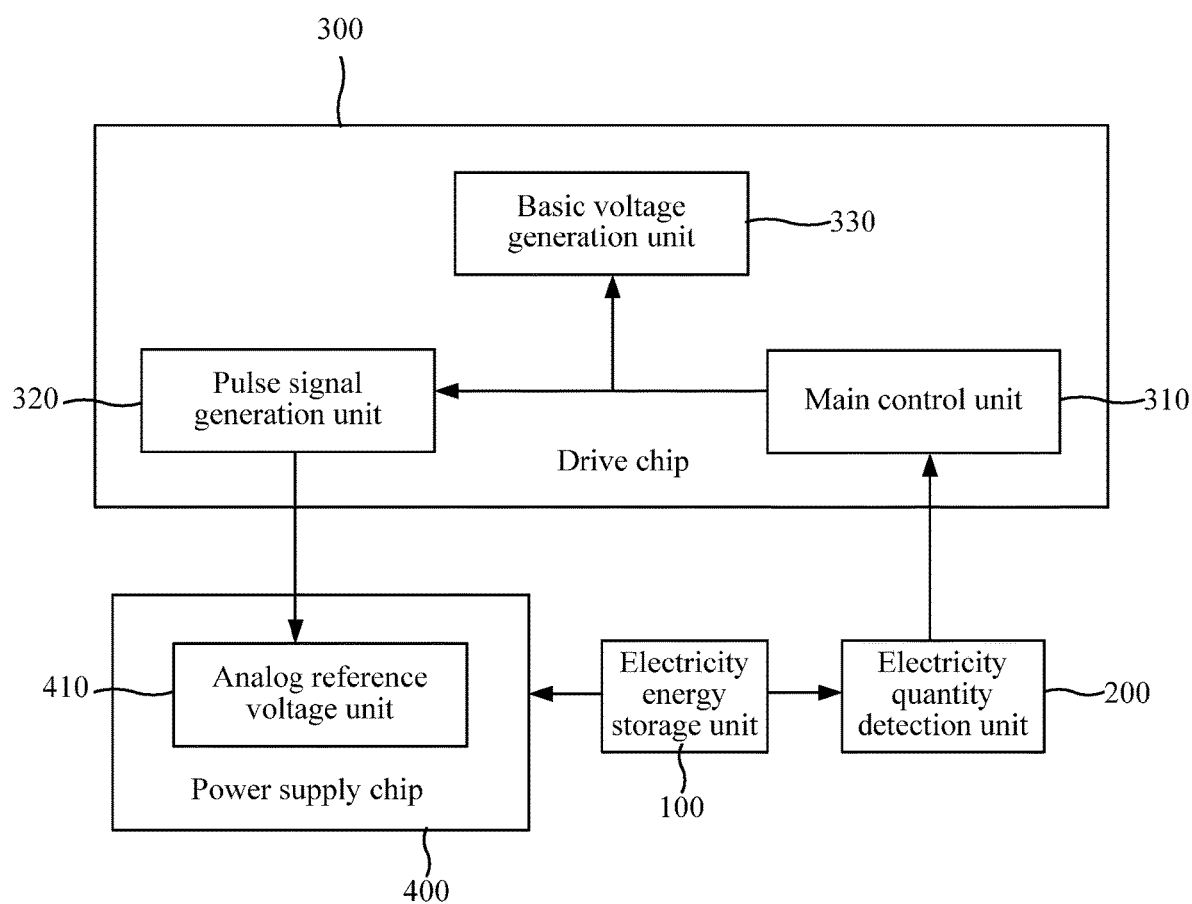
FIG. 5 is a structural diagram of another drive module provided by an embodiment of the present disclosure.

FIG. 5 is a structural diagram of another drive module provided by an embodiment of the present disclosure. As shown in FIG. 5, a drive chip 300 further includes a basic voltage generation unit 330, where the basic voltage generation unit 330 is connected to the main control unit 310.

The main control unit 310 is further configured to: determine, according to the voltage value of the analog reference voltage, a relevant relationship between basic voltages and a preset value of part of the basic voltages, a voltage multiplying coefficient of a basic voltage relation; calculate and obtain, according to the voltage value of the analog reference voltage, the relevant relationship between the basic voltages and the voltage multiplying coefficient, an actual output value of each of the basic voltages; and generate instruction information including the actual output value.

The basic voltage generation unit 330 is configured to generate a respective basic voltage according to the instruction information.

Specifically, drive signals provided by the drive chip 300 for the display panel mainly include: 1. data signals; 2. drive signals required by a gate drive circuit; and 3. multiple drive signals directly provided for the display panel. The drive signals directly provided for the display panel in 3 are the basic voltage signals in this embodiment, and specifically include, for example, a positive power supply signal AVDD, a high level signal VGH, a low level signal VGL, a reset signal VREF and the like.

The solution in this embodiment is described below in detail by way of examples.

The analog reference voltage is denoted as VCI, and the voltage value of the analog reference voltage calculated in the preceding step is VCI1.

Exemplarily, multiple basic voltages include a positive power supply voltage AVDD, a negative power supply voltage VCL, a high level voltage VGH, a low level voltage VGL, and a reference voltage VREF; and part of the basic voltages include the high level voltage VGH, the low level voltage VGL, and the reference voltage VREF.

The relevant relationship between the basic voltages includes: the VGH deriving from the AVDD, the VREF deriving from the VCL, and multiple basic voltage relations.

The basic voltage relations include:

$AVDD = aVCI$  Formula 1;

$VGH = bAVDD$  Formula 2;

$VCL = cVCI$  Formula 3;

$VGL = VCL + dVCI$  Formula 4.

In the above basic voltage relations, a, b, c and d are voltage multiplying coefficients of the basic voltage relations.

The preset value of some basic voltages includes: VGH=6V; VGL=−6V; and VREF=−3V.

In the drive chip 200, a VGH output efficiency P1 equals to a VGH preset value divided by a VGH actual output value, a VREF output efficiency P2 equals to a VREF preset value divided by a VREF actual output value, and a VGL output efficiency P3 equals to a VGL preset value divided by a VGL actual output value.

Specifically, the process of determining the voltage multiplying coefficients includes steps described below.

In step 1, since the VGH is derived from the AVDD, in the case where a preset value of the VGH is 6V, an expected actual output value of the AVDD is 6 V, that is, aVCI in Formula 1 is expected to be greater than and closest to 6 V, where VCI1 is a known quantity. Exemplarily, the VCI1 calculated in the preceding step is 2.8 V, and then a is 3; and it can be calculated according to Formula 1 that the actual output value of the AVDD is 3VCI=8.4 V.

In step 2, in Formula 2, the AVDD has been calculated and obtained in step 1 and is a known quantity, the preset value of the VGH is 6 V, and the bAVDD in Formula 2 is expected to be greater than and closest to 6 V. Exemplarily, AVDD=8.4 V, and then b is 1; and it can be calculated according to Formula 2 that the actual output value of the VGH is AVDD=8.4 V.

In step 3, since the VREF is derived from the VCL and the preset value of the VREF is −3 V, an expected actual output value of the VCL is −3 V, that is, cVCI in Formula 3 is expected to be less than and closest to −3 V, where VCI1 is a known quantity. Exemplarily, the VCI1 calculated in the preceding step is 2.8 V, and then c is −2; and it can be calculated according to Formula 3 that the actual output value of the VCL is −2VCI=−5.6 V.

In step 4, in Formula 4, the VCL has been calculated and obtained in step 1 and is a known quantity, VCI1 is also a known quantity, the preset value of the VGH is −6 V, and then VCL+dVCI in Formula 4 is expected to be less than and closest to −6 V. Exemplarily, the VCI1 calculated and obtained in the preceding step is 2.8 V, the actual output value of the VCL is −5.6, and then d=−1; and it can be calculated according to Formula 4 that the actual output value of the VGL is −8.4 V.

It is to be noted that, in the above basic voltage relations: for the parameter where the voltage signal on the left is a positive voltage signal, in the process of determining the voltage multiplying coefficient, the calculation result on the right is expected to be greater than and closest to the preset value of the voltage signal on the left. For a parameter where the voltage signal is a negative voltage signal, in the process of determining the voltage multiplying coefficient, the calculation result on the right is expected to be less than and closest to the preset value of the voltage signal on the left. In this manner, the output efficiency of the respective basic voltage signal in the drive chip 300 can be maximized, thereby improving the overall output efficiency of the drive chip 300.

After the main control unit 310 executes the above steps 1 to 4, the actual output values of the basic voltages AVDD, VCL, VGH, VGL, and VREF are obtained, and then instruction information including the above actual output values is generated. The basic voltage generation unit 330 generates the corresponding basic voltage signals, and outputs the basic voltage signals to the display panel.

Table 3 is a comparison table of a basic voltage output efficiency of a drive chip provided by an embodiment of the present disclosure. In the comparison table, the analog reference voltage output efficiency 1 of the power supply chip is the analog reference voltage output efficiency of the power supply chip in the case where the analog reference voltage is fixed at 2.8 V in the related art. The output voltage setting 1 of the drive chip is the basic voltage relation in the case where the analog reference voltage is fixed at 2.8 V in the related art. The basic voltage output efficiency 1 of the drive chip is the basic voltage output efficiency in the case where the analog reference voltage is fixed at 2.8 V in the related art.

TABLE 3

| Remaining electricity quantity of electrical energy storage unit | Output voltage VBAT of electrical energy storage unit | Analog reference voltage is fixed at 2.8 V | Analog reference voltage output efficiency 1 of Power IC | Output voltage setting 1 of drive chip | Basic voltage output efficiency 1 of drive chip | Analog reference voltage is dynamically adjusted | Analog reference voltage output efficiency 2 of Power IC | Output voltage setting 2 of drive chip | Basic voltage output efficiency 2 of drive chip | Total efficiency |
|---|---|---|---|---|---|---|---|---|---|---|
| 100% | 4.20 V | There is no need to boost the VBAT input into the power supply chip, and the analog reference voltage output efficiency of the power supply chip is approximately equal to VCI/VBAT | 66.67% | AVDD = 3VCI VGH = AVDD VCL = −2VCI VGL = VCL−VCI | VGH = 6/8.4 VREF = 3/5.6 VGL = 6/8.4 | 3.6 V | 85.71% ↑ | AVDD = 2VCI VGHR = AVDD VCL = −VCI VGLR = VCL−VCI | VGH = 6/7.2 ↑ VREF = 3/3.6 ↑ VGL = 6/7.2 ↑ | ↑ |
| 90% | 4.06 V | | 68.97% | | | 3.6 V | 88.67% ↑ | | | |
| 80% | 3.98 V | | 70.35% | | | 3.6 V | 90.45% ↑ | | | |
| 70% | 3.92 V | | 71.43% | | | 3.6 V | 91.84% ↑ | | | |
| 60% | 3.87 V | | 72.35% | | | 3.6 V | 93.02% ↑ | | | |
| 50% | 3.82 V | | 73.30% | | | | | | | |
| 40% | 3.79 V | | 73.88% | | | 3.5 V | 91.62% ↑ | AVDD = 2VCI VGH = AVDD VCL = −VCI VGL = VCL−VCI | VGH = 6/7 ↑ VREF = 3/3.5 ↑ VGL = 6/7 ↑ | ↑ |
| | | | | | | 3.5 V | 92.35% ↑ | | | |
| 30% | 3.77 V | | 74.27% | | | 3.4 V | 90.19% ↑ | AVDD = 2VCI VGH = AVDD VCL = −VCI VGL = VCL−VCI | VGH = 6/6.8 ↑ VREF = 3/3.4 ↑ VGL = 6/6.8 ↑ | ↑ |
| 20% | 3.74 V | | 74.87% | | | 3.4 V | 90.91% ↑ | | | |
| 10% | 3.68 V | | 76.09% | | | 3.3 V | 89.67% ↑ | AVDD = 2VCI VGH = AVDD VCL = −VCI VGL = VCL−VCI | VGH = 6/6.6 ↑ VREF = 3/3.3 ↑ VGL = 6/6.6 ↑ | ↑ |
| 5% | 3.45 V | | 81.16% | | | 3.2 V | 92.75% ↑ | AVDD = VCI VGH = AVDD VCL = −2VCI VGL = VCL−VCI | VGH = 6/6.4 ↑ VREF = 3/3.2 ↑ VGL = 6/6.4 ↑ | ↑ |
| 0% | 3.00 V | | 93.33% | | | 2.8 V | 93.33% = | AVDD = 3VCI VGH = AVDD VCL = −2VCI VGL = VCL−VCI | VGH = 6/8.4 = VREF = 3/5.6 = VGL = 6/8.4 = | = |

In addition, in Table 3, the analog reference voltage output efficiency 2 of the power supply chip is the analog reference voltage output efficiency of the power supply chip in the case where the analog reference voltage dynamically changes according to the output voltage of the electrical energy storage unit in the embodiment of the present disclosure. The output voltage setting 2 of the drive chip is the basic voltage relation in the case where the analog reference voltage dynamically changes according to the output voltage of the electrical energy storage unit in the embodiment of the present disclosure. The basic voltage output efficiency 2 of the drive chip is the basic voltage output efficiency in the case where the analog reference voltage dynamically changes according to the output voltage of the electrical energy storage unit in the embodiment of the present disclosure.

As shown in Table 3, in this embodiment, the analog reference voltage output efficiencies of the power supply chip under different output voltages of the electrical energy storage unit have a relatively small difference and are maintained at the optimal efficiency value. Compared with the solution in which the analog reference voltage is fixed in the related art, in this embodiment, the analog reference voltage output efficiencies of the power supply chip under the different output voltages of the electrical energy storage unit are all larger than corresponding ones in the related art, except that several ones of the analog reference voltage output efficiencies are equal to corresponding ones in the related art. In addition, compared with the solution in which the analog reference voltage is fixed in the related art, in this embodiment, the basic voltage output efficiencies of the drive chip under the different output voltages of the electrical energy storage unit are all larger than corresponding ones in the related art, except that several ones of the basic voltage output efficiencies are equal to corresponding ones in the related art. Then, in this embodiment, the total output efficiencies of the power supply chip and the drive chip under the different output voltages of the electrical energy storage unit are all larger than corresponding ones in the related art, except that several ones of the total output efficiencies are equal to corresponding ones in the related art.

These indicate that the solution of this embodiment can effectively improve the output efficiencies of the respective basic voltages of the drive chip, thereby improving the overall output efficiency of the drive chip, and then achieving the improvement of the overall output efficiency of the drive module in combination with the improvement of the analog reference voltage output efficiency of the power supply chip.

Figure 6:
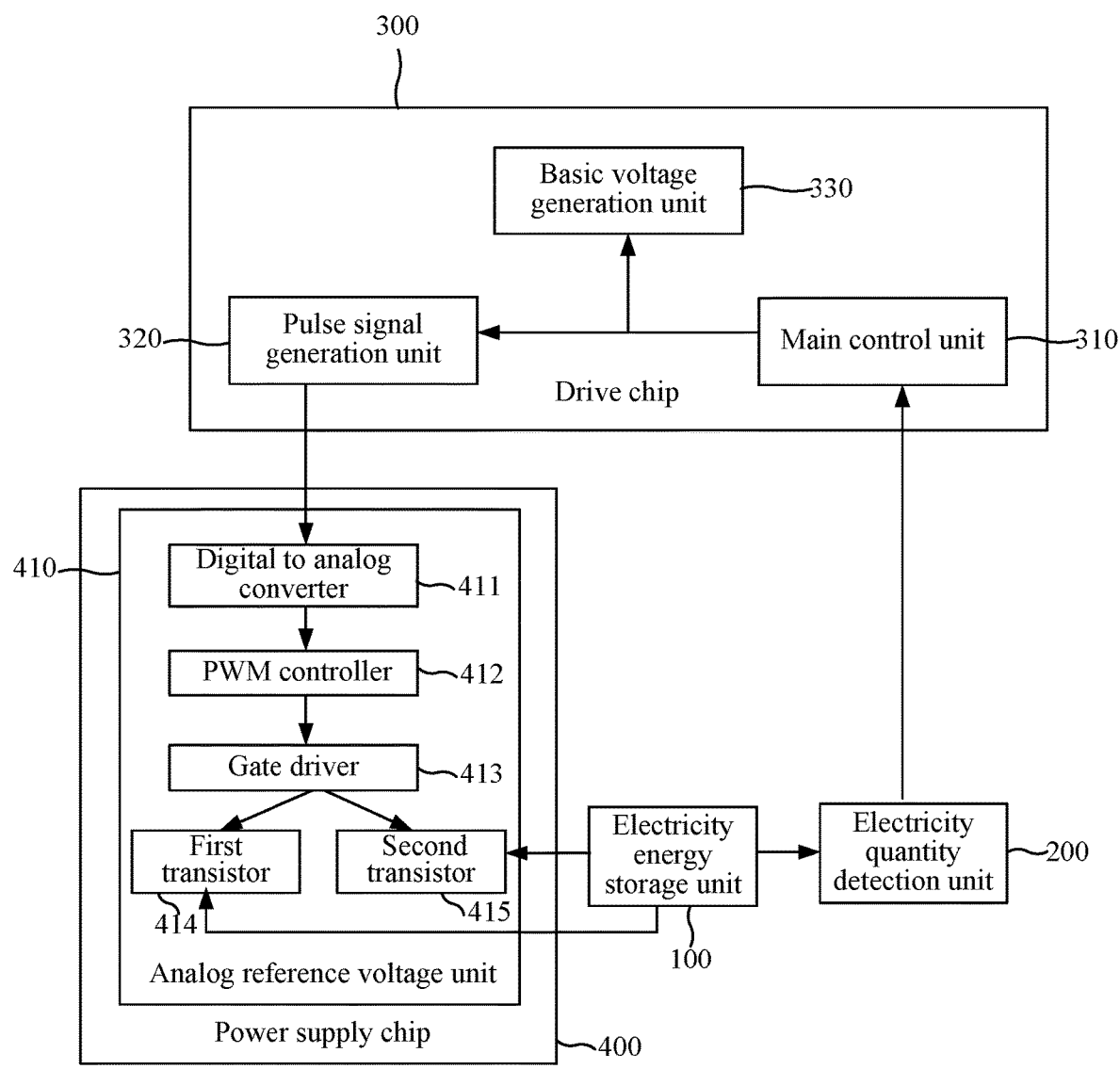
FIG. 6 is a structural diagram of another drive module provided by an embodiment of the present disclosure.

Exemplarily, the pulse signal information may be the number of continuous pulses. Specifically, FIG. 6 is a structural diagram of another drive chip provided by an embodiment of the present disclosure. As shown in FIG. 6, the analog reference voltage unit 410 includes a digital to analog converter 411, a PWM (Pulse Width Modulation) controller 412, a gate driver 413, a first transistor 414 and a second transistor 415. The PWM controller 412 is connected to the digital to analog converter 411, the gate driver 413 is connected to the PWM controller 412, a gate of the first transistor 414 is connected to the gate driver 413, a gate of the second transistor 415 is connected to the gate driver 413, a first pole of the first transistor 414, a second pole of the second transistor 415 and the electrical energy storage unit 100 are connected, a second pole of the first transistor 414 is grounded, and a first pole of the second transistor 415 is connected to a signal output terminal of the analog reference voltage unit 410.

The digital to analog converter 411 is configured to convert the pulse signal in a digital form into a pulse signal in an analog form, the PWM controller 412 is configured to generate a pulse signal having a corresponding duty cycle based on the pulse signal in the analog form, and the gate driver 413 is configured to control, according to the pulse signal having the corresponding duty cycle, the first transistor 414 and the second transistor 415 to be alternately turned on to output the corresponding analog reference voltage signal.

Figure 7:
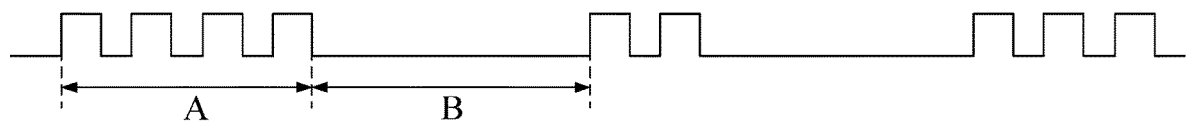
FIG. 7 is a schematic diagram of a pulse signal provided by an embodiment of the present disclosure.

Specifically, FIG. 7 is a schematic diagram of a pulse signal provided by an embodiment of the present disclosure. As shown in FIG. 7, the pulse signal includes a continuous pulse stage A and a holding stage B, and the continuous pulse stage A and the hold stage B are alternately disposed. In this embodiment, the number of continuous pulses as the pulse signal information is the number of pulses in the continuous pulse stage A. The number of pulses in each continuous pulse stage A is not fixed. Exemplarily, a continuous pulse stage A in which the number of pulses is greater than or equal to X and less than or equal to Y is applicable to the analog reference voltage unit 410 and may be used for adjusting the output voltage of the electrical energy storage unit 100 to obtain a corresponding analog reference voltage signal, where X and Y are reasonably configured according to actual needs. It is to be understood that the analog reference voltage signals corresponding to different numbers of pulses are different, thereby achieving the effect of adjusting the analog reference voltage signals by the number of pulses.

It is to be noted that actual output signals of the power supply chip 400 include other voltage signals in addition to the analog reference voltage signal. The number of continuous pulses is used as the pulse signal information so that all voltage signals can be adjusted by using the same pulse signal, and just by controlling the value range of the number of pulses in the continuous pulse stage A corresponding to different voltage signals to be different.

Figure 8:
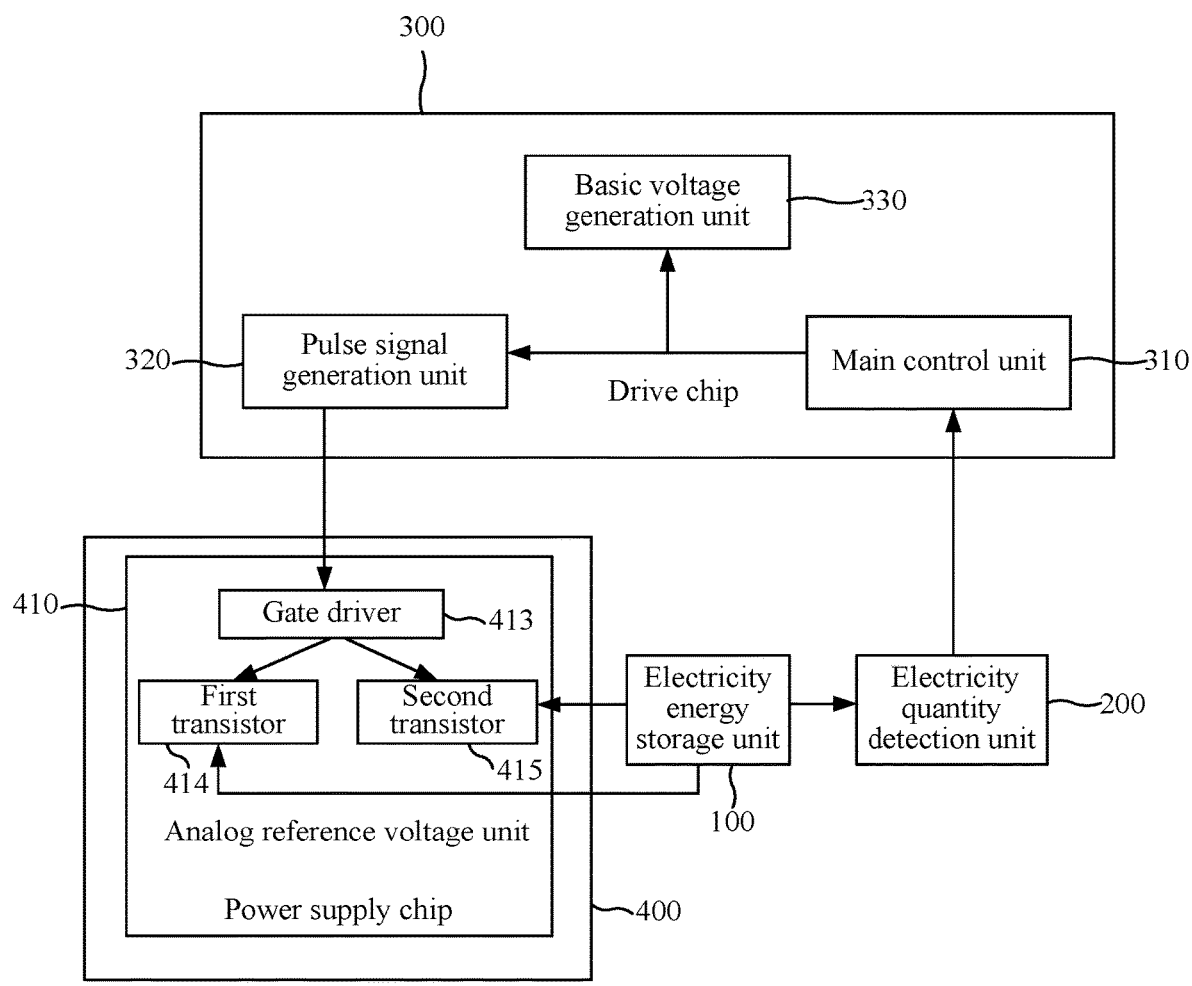
FIG. 8 is a structural diagram of another drive module provided by an embodiment of the present disclosure.

Optionally, in other embodiments of the present embodiment, the pulse signal information is a duty cycle of the pulse signal. Specifically, FIG. 8 is a structural diagram of another drive module provided by an embodiment of the present disclosure. As shown in FIG. 8, the analog reference voltage unit 410 includes a gate driver 413, a first transistor 414 and a second transistor 415, a gate of the first transistor 414 is connected to the gate driver 413, a gate of the second transistor 415 is connected to the gate driver 413, a first pole of the first transistor 414 and a second pole of the second transistor 415 are connected to the electrical energy storage unit 100, a second pole of the first transistor 414 is grounded, and a first pole of the second transistor 415 is connected to an output terminal of the analog reference voltage unit 410.

The gate driver 413 is configured to control, according to the pulse signal, the first transistor 414 and the second transistor 415 to alternately be turned on to output the corresponding analog reference voltage signal.

In this way, the analog reference voltage unit 410 can obtain different analog reference voltage signals by using pulse signals with different duty cycles without performing conversion from the number of continuous pulses to the duty cycle on the pulse signals, so that there is no need to provide a corresponding component in the analog reference voltage unit 410, which facilitates simplifying the structure of the analog reference voltage unit 410.

Figure 9:
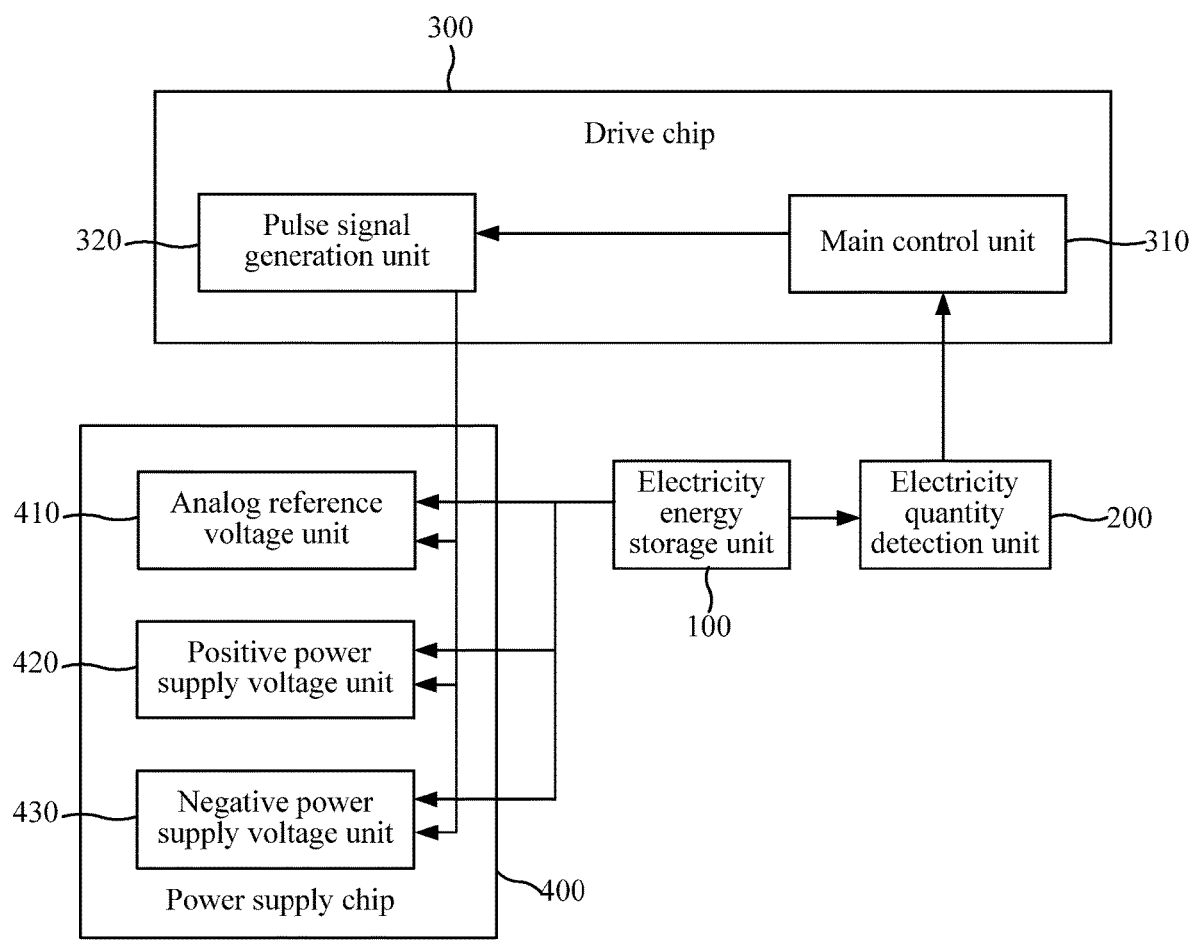
FIG. 9 is a structural diagram of another drive module provided by an embodiment of the present disclosure.

FIG. 9 is a structural diagram of another drive module provided by an embodiment of the present disclosure. As shown in FIG. 9, the power supply chip 400 further includes a positive power supply voltage unit 420 and a negative power supply voltage unit 430. The positive power supply voltage unit 420 is connected to the pulse signal generation unit 320, and the negative power supply voltage unit 430 is connected to the pulse signal generation unit 320. The positive power supply voltage unit 420 is configured to generate and output a corresponding positive power supply voltage signal according to the pulse signal, and the negative power supply voltage unit 430 is configured to generate and output a corresponding negative power supply voltage signal according to the pulse signal.

The positive power supply voltage signal and the negative power supply voltage signal are transmitted to the display panel for providing a power supply signal to the display panel.

In this embodiment, the analog reference voltage unit 410, the positive power supply voltage unit 420, and the negative power supply voltage unit 430 share a same pulse signal, and according to difference pulse signal information in the pulse signal, voltage units to which the difference pulse signal information is specifically applicable are distinguished. Exemplarily, in a case where the pulse signal information is the number of continuous pulses, if the number of continuous pulses is between 3 to 5, the pulse signal information is applicable to the analog reference voltage unit 410; if the number of continuous pulses is between 7 to 9, the pulse signal information is applicable to the positive power supply voltage unit 420; and if the number of continuous pulses is between 12 to 14, the pulse signal information is applicable to the negative power supply voltage unit 430.

It is to be noted that the positive power supply voltage unit 420 and the negative power supply voltage unit 430 are provided so that the power supply chip 400 can provide various voltage signals, thereby ensuring the normal working of the drive chip 300 and the display panel.

Figure 10:
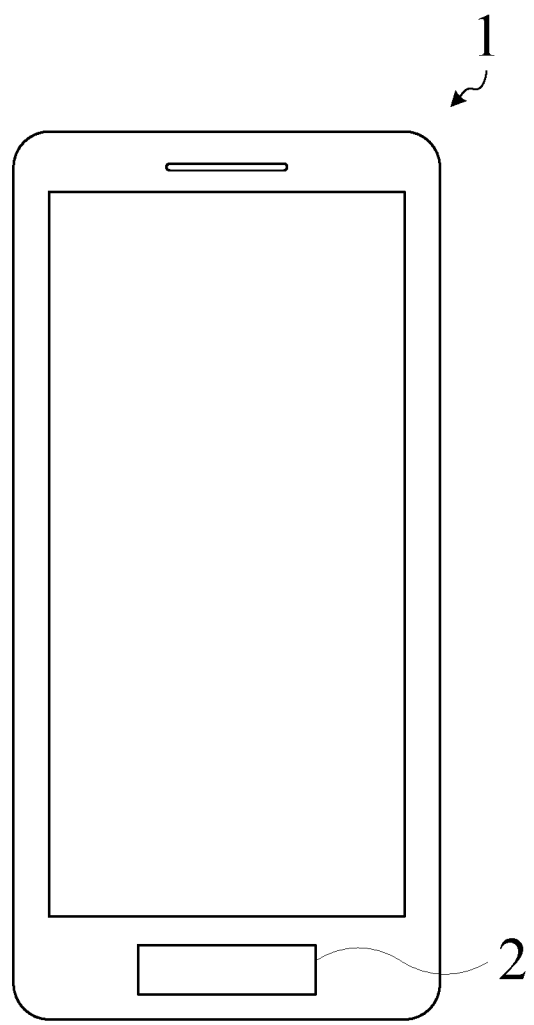
FIG. 10 is a structural diagram of a display device provided by an embodiment of the present disclosure.

FIG. 10 is a structural diagram of a display device provided by an embodiment of the present disclosure. As shown in FIG. 10, the display device 1 includes a drive module 2 provided in any embodiment of the present disclosure. The display device 1 provided in this embodiment of the present disclosure includes the drive module 2 in any embodiment of the present disclosure, has the technical features of the drive module 2 in any embodiment of the present disclosure, and has beneficial effects that are the same as or correspond to the beneficial effects of the drive module 2 included in the display device 1, which are not repeated here.

Figure 11:
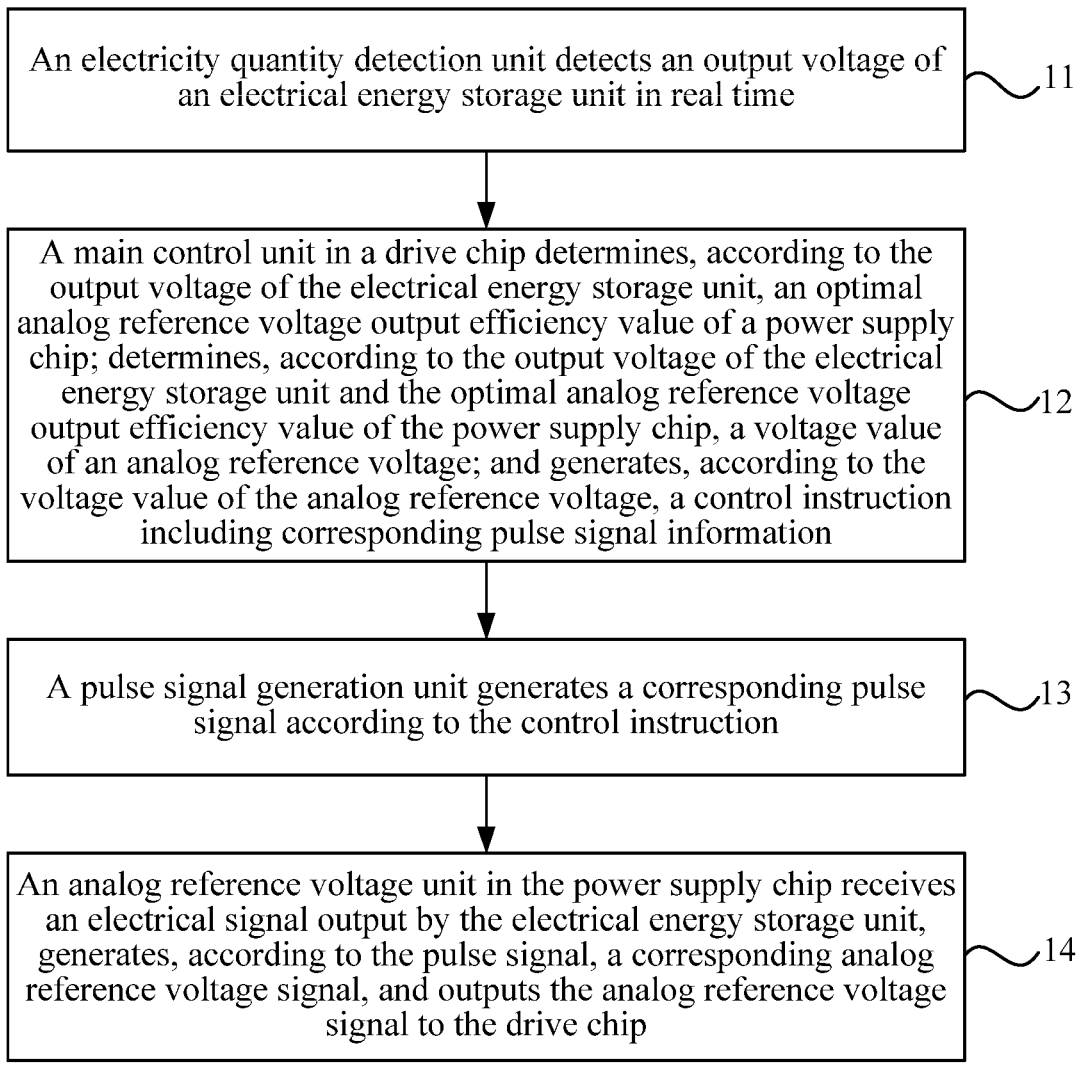
FIG. 11 is a flowchart of a voltage generation method of a drive module provided by an embodiment of the present disclosure.

FIG. 11 is a flowchart of a voltage generation method of a drive module provided by an embodiment of the present disclosure. As shown in FIG. 11, the voltage generation method of the drive module may specifically include the steps described below.

In step 11, an electricity quantity detection unit detects an output voltage of an electrical energy storage unit in real time.

In step 12, a main control unit in a drive chip determines, according to the output voltage of the electrical energy storage unit, an optimal analog reference voltage output efficiency value of a power supply chip; determines, according to the output voltage of the electrical energy storage unit and the optimal analog reference voltage output efficiency value of the power supply chip, a voltage value of an analog reference voltage; and generates, according to the voltage value of the analog reference voltage, a control instruction including corresponding pulse signal information.

In step 13, a pulse signal generation unit generates a corresponding pulse signal according to the control instruction.

In step 14, an analog reference voltage unit in the power supply chip receives an electrical signal output by the electrical energy storage unit; generates, according to the pulse signal, a corresponding analog reference voltage signal; and outputs the analog reference voltage signal to the drive chip.

In the solution provided by this embodiment, the electricity quantity detection unit detects the output voltage of the electrical energy storage unit in real time; the main control in the drive chip determines, according to the output voltage of the electrical energy storage unit, the optimal analog reference voltage output efficiency value of the power supply chip, determines, according to the output voltage of the electrical energy storage unit and the optimal analog reference voltage output efficiency value of the power supply chip, the voltage value of the analog reference voltage, and generates, according to the voltage value of the analog reference voltage, the control instruction including corresponding pulse signal information; the pulse signal generation unit generates a corresponding pulse signal according to the control instruction; and the analog reference voltage unit in the power supply chip receives the electrical signal output by the electrical energy storage unit, generates, according to the pulse signal, a corresponding analog reference voltage signal, and outputs the analog reference voltage signal to the drive chip, so that the analog reference voltage output by the power supply chip can be adjusted in real time according to the output voltage of the electrical energy storage unit, the dynamic change of the analog reference voltage is achieved, and the analog reference voltage output efficiency of the power supply chip is maintained at about the optimal analog reference voltage output efficiency value, thereby effectively reducing the electricity loss.

Exemplarily, the step in which the electricity quantity detection unit detects the output voltage of the electrical energy storage unit in real time may include: a gamma voltage generation circuit provides a plurality of dynamically changing voltage signals in real time, a comparator compares the voltage signals with an output voltage of the electrical energy storage unit in real time, and a voltage interval determination unit outputs the output voltage of the electrical energy storage unit, where the output voltage of the electrical energy storage unit is between two of the voltage signals corresponding to adjacent two different output values of the comparator.

Figure 12:
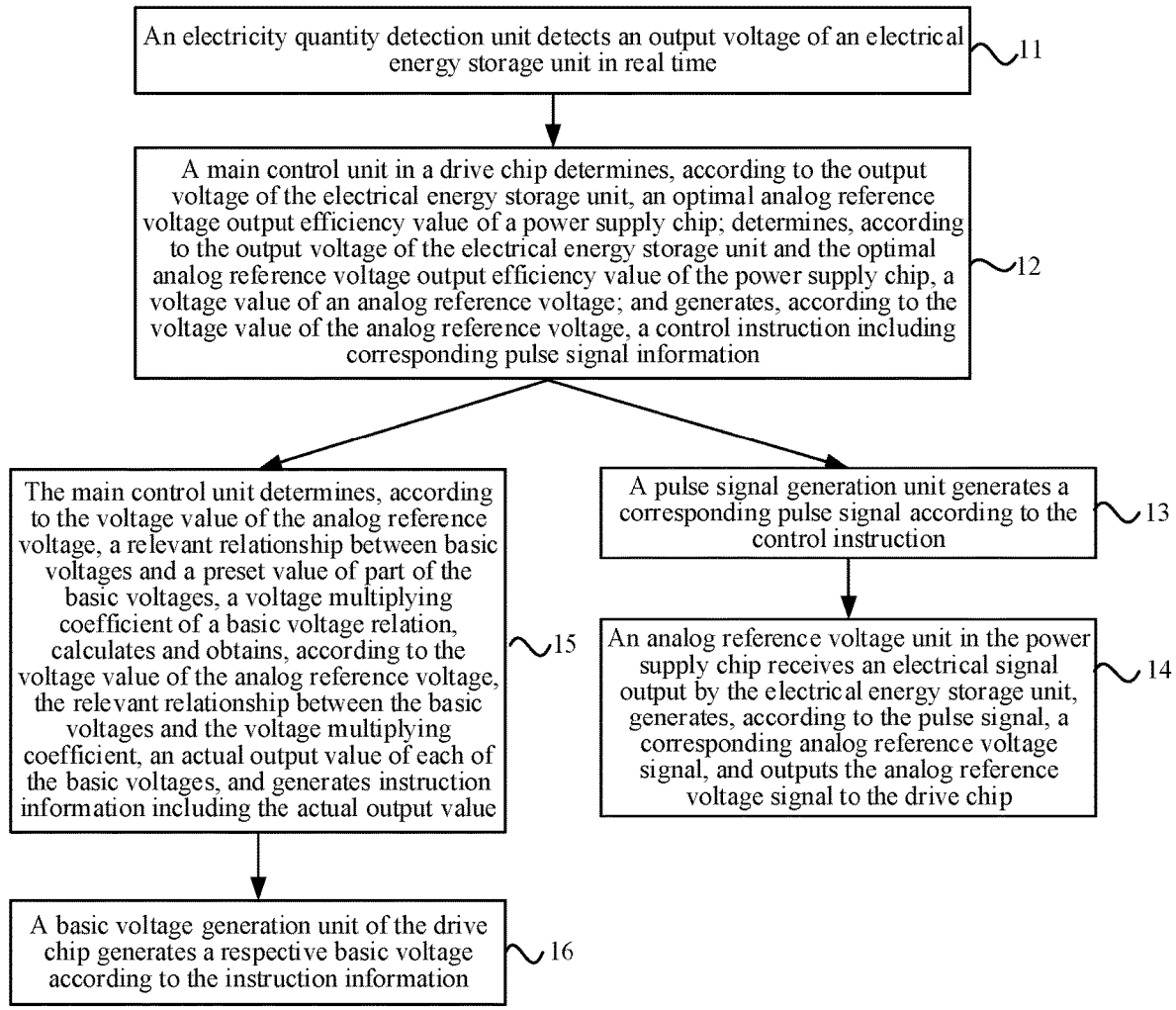
FIG. 12 is a flowchart of another voltage generation method of a drive module provided by an embodiment of the present disclosure.

FIG. 12 is a flowchart of another voltage generation method of a drive module provided by an embodiment of the present disclosure. As shown in FIG. 12, on the basis of FIG. 11, after the voltage value of the analog reference voltage is determined, the method further includes steps described below.

In step 15, the main control unit determines, according to the voltage value of the analog reference voltage, a relevant relationship between basic voltages and a preset value of part of the basic voltages, a voltage multiplying coefficient of a basic voltage relation, calculates and obtains, according to the voltage value of the analog reference voltage, the relevant relationship between the basic voltages and the voltage multiplying coefficient, an actual output value of each of the basic voltages, and generates instruction information including the actual output value.

In step 16, a basic voltage generation unit of the drive chip generates a respective basic voltage according to the instruction information.

Optionally, the step in which the pulse signal generation unit generates the corresponding pulse signal according to the control instruction may include: the pulse signal generation unit generates a corresponding pulse signal according to information about a number of continuous pulses in the control instruction.

Figure 13:
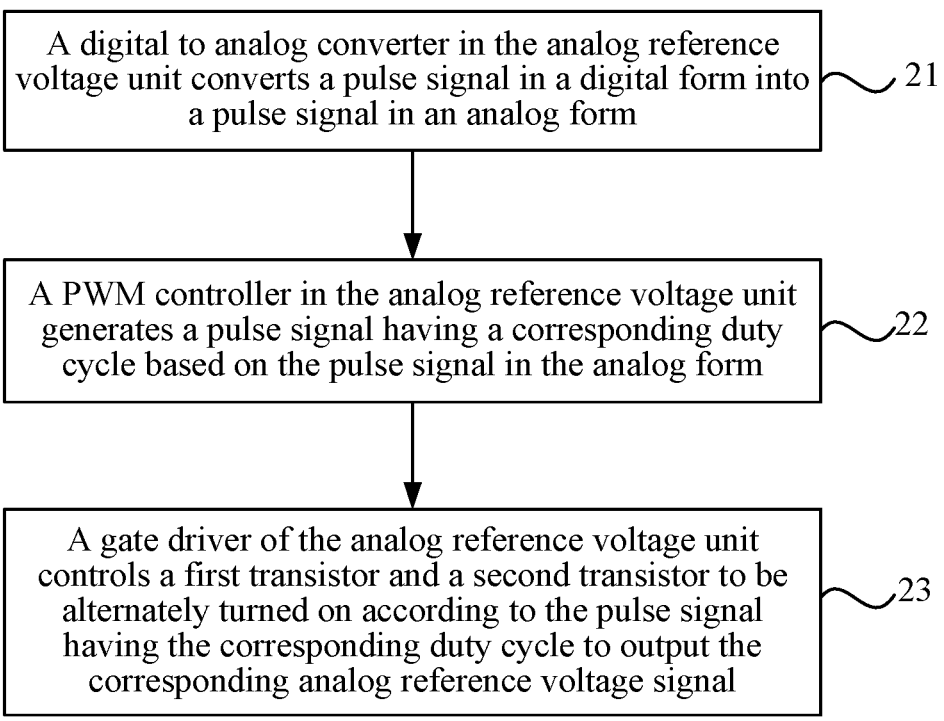
FIG. 13 is a flowchart of a method for generating and outputting electrical signals of the corresponding analog reference voltage according to the pulse signal provided by an embodiment of the present disclosure.

Exemplarily, FIG. 13 is a flowchart of a method for generating and outputting electrical signals of the corresponding analog reference voltage according to the pulse signal provided by an embodiment of the present disclosure. As shown in FIG. 13, the step in which the analog reference voltage unit in the power supply chip receives the electrical signal output by the electrical energy storage unit, generates and outputs, according to the pulse signal, a corresponding analog reference voltage signal may include steps described below.

In step 21, a digital to analog converter in the analog reference voltage unit converts a pulse signal in a digital form into a pulse signal in an analog form.

In step 22, a PWM controller in the analog reference voltage unit generates a pulse signal having a corresponding duty cycle based on the pulse signal in the analog form.

In step 23: a gate driver in the analog reference voltage unit controls a first transistor and a second transistor in the analog reference voltage unit to be alternately turned on according to the pulse signal having the corresponding duty cycle to output the corresponding analog reference voltage signal.

Optionally, the step in which the pulse signal generation unit generates the corresponding pulse signal according to the control instruction may include: the pulse signal generation unit generates a corresponding pulse signal based on information about a duty cycle of the pulse signal in the control instruction.

Exemplarily, the step in which the analog reference voltage unit in the power supply chip receives the electrical signal output by the electrical energy storage unit, generates and outputs, according to the pulse signal, a corresponding analog reference voltage signal may include: the gate driver in the analog reference voltage unit controls, according to the pulse signal, the first transistor and the second transistor in the analog reference voltage unit to be alternately turned on to output the corresponding analog reference voltage signal.

Figure 14:
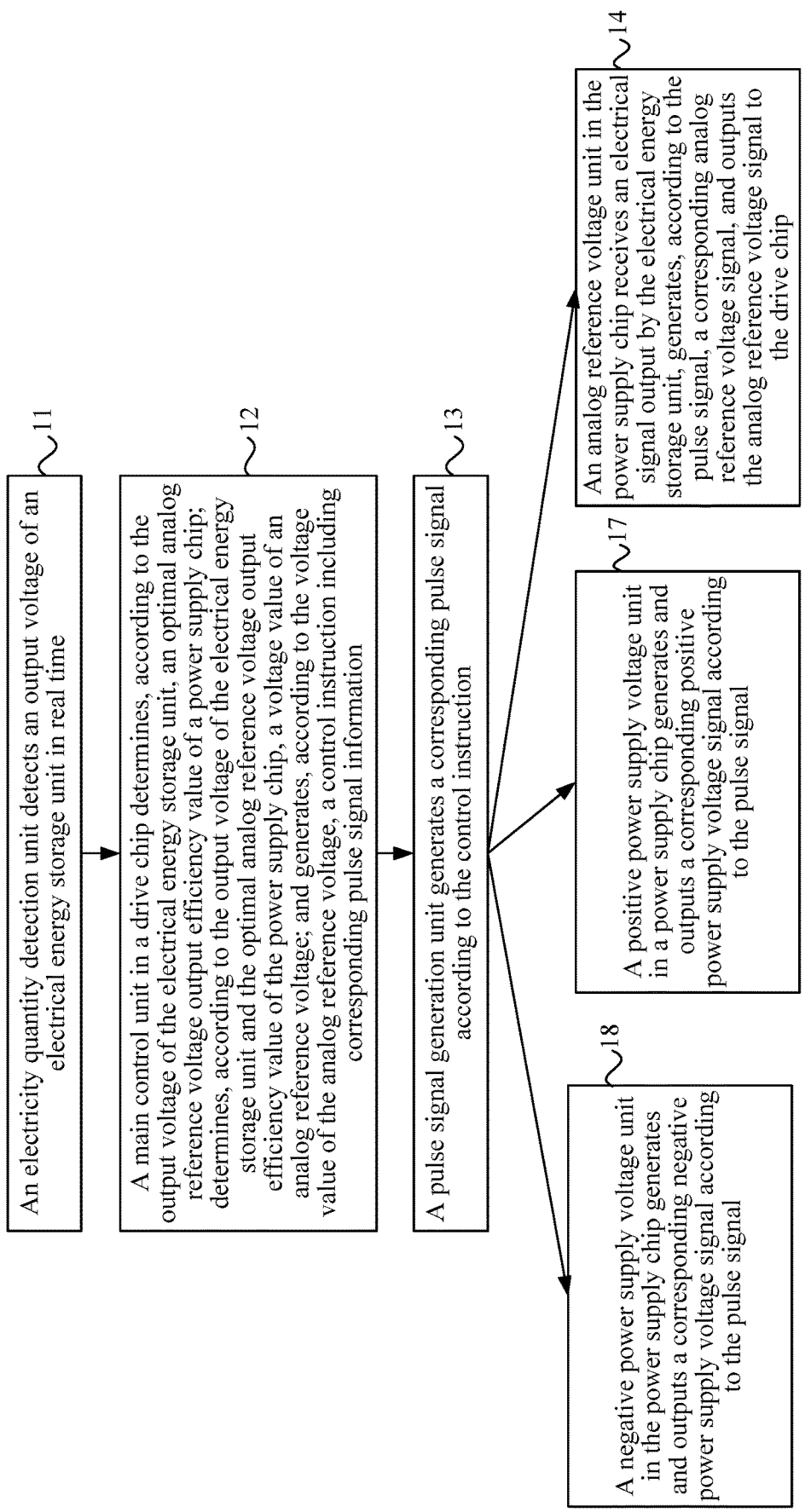
FIG. 14 is a flowchart of another voltage generation method of a drive module provided by an embodiment of the present disclosure.

FIG. 14 is a flowchart of another voltage generation method of a drive module provided by an embodiment of the present disclosure. As shown in FIG. 14, on the basis of FIG. 11, after a pulse signal generation unit generates a corresponding pulse signal according to a control instruction, the method further includes steps described below.

In step 17, a positive power supply voltage unit in a power supply chip generates and outputs a corresponding positive power supply voltage signal according to the pulse signal.

In step 18, a negative power supply voltage unit in the power supply chip generates and outputs a corresponding negative power supply voltage signal according to the pulse signal.

It is to be noted that the above are only preferred embodiments of the present disclosure and the technical principles used therein. It should be understood by those skilled in the art that the present disclosure is not limited to the embodiments described herein. For those skilled in the art, various apparent variations, re-adaptations, combinations and substitutions can be made without departing from the scope of the present disclosure. Therefore, while the present disclosure has been described in detail via the preceding embodiments, the present disclosure is not limited to the preceding embodiments and may include other equivalent embodiments without departing from the concept of the present disclosure, and the scope of the present disclosure is determined by the appended claims.

What is claimed is:

1. A drive module, comprising:
   an electrical energy storage unit, which is configured to supply power;
   an electricity quantity detection unit, which is connected to the electrical energy storage unit and is configured to detect an output voltage of the electrical energy storage unit in real time;
   a drive chip, wherein the drive chip comprises a main control unit and a pulse signal generation unit; wherein the electricity quantity detection unit, the main control unit and the pulse signal generation unit are sequentially connected; wherein the main control unit is configured to determine, according to the output voltage of the electrical energy storage unit, an optimal analog reference voltage output efficiency value of a power supply chip, determine, according to the output voltage of the electrical energy storage unit and the optimal analog reference voltage output efficiency value of the power supply chip, a voltage value of an analog reference voltage, and generate, according to the voltage value of the analog reference voltage, a control instruction comprising corresponding pulse signal information; and wherein the pulse signal generation unit is configured to generate, according to the control instruction, a corresponding pulse signal; and
   the power supply chip, which comprises an analog reference voltage unit, wherein the analog reference voltage unit is connected to the pulse signal generation unit and the electrical energy storage unit; and wherein the analog reference voltage unit is configured to receive an electrical signal output by the electrical energy storage unit, generate, according to the pulse signal, a corresponding analog reference voltage signal, and output the analog reference voltage signal to the drive chip.

2. The drive module of claim 1, wherein the electrical energy storage unit is a battery.

3. The drive module of claim 1, wherein the electricity quantity detection unit is an electricity quantity detection chip, and both the electricity quantity detection chip and the electrical energy storage unit are located on a main board.

4. The drive module of claim 1, wherein the electricity quantity detection unit comprises a gamma voltage generation circuit, a comparator and a voltage interval determination unit which are sequentially connected, the gamma voltage generation circuit is configured to provide a plurality of dynamically changing voltage signals in real time, the comparator is configured to compare the voltage signals and an output voltage of the electrical energy storage unit in real time, and the voltage interval determination unit is configured to output the output voltage of the electrical energy storage unit, wherein the output voltage of the electrical energy storage unit is between two of the voltage signals corresponding to adjacent two different output values of the comparator; and
   the gamma voltage generation circuit, the comparator and the voltage interval determination unit are all disposed in the drive chip.

5. The drive module of claim 1, wherein the drive chip further comprises a basic voltage generation unit, wherein the basic voltage generation unit is connected to the main control unit;
   the main control unit is further configured to determine, according to the voltage value of the analog reference voltage, a relevant relationship between basic voltages and a preset value of part of the basic voltages, a voltage multiplying coefficient of a basic voltage relation, calculate and obtain, according to the voltage value of the analog reference voltage, the relevant relationship between the basic voltages and the voltage multiplying coefficient, an actual output value of each of the basic voltages, and generate instruction information comprising the actual output value; and
   the basic voltage generation unit is configured to generate a respective basic voltage according to the instruction information.

6. The drive module of claim 5, wherein the basic voltages comprises a positive power supply voltage, a negative power supply voltage, a high-level voltage, a low-level voltage, and a reference voltage; and
   the part of the basic voltages comprise the high-level voltage, the low-level voltage, and the reference voltage.

7. The drive module of claim 1, wherein the pulse signal information is a number of continuous pulses;
   wherein the analog reference voltage unit comprises a digital to analog converter, a PWM (Pulse Width Modulation) controller, a gate driver, a first transistor and a second transistor; the PWM controller is connected to the digital to analog converter; the gate driver is connected to the PWM controller; a gate of the first transistor is connected to the gate driver; a gate of the second transistor is connected to the gate driver; a first pole of the first transistor, a second pole of the second transistor and the electrical energy storage unit are connected; a second pole of the first transistor is grounded; and a first pole of the second transistor is connected to a signal output terminal of the analog reference voltage unit; and wherein the digital to analog converter is configured to convert the pulse signal in a digital form into a pulse signal in an analog form; the PWM controller is configured to generate a pulse signal having a corresponding duty cycle based on the pulse signal in the analog form; and the gate driver is configured to control, according to the pulse signal having the corresponding duty cycle, the first transistor and the second transistor to be alternately turned on to output the corresponding analog reference voltage signal.

8. The drive module of claim 1, wherein the pulse signal information is a duty cycle of the pulse signal;

wherein the analog reference voltage unit comprises a gate driver, a first transistor and a second transistor; a gate of the first transistor is connected to the gate driver; a gate of the second transistor is connected to the gate driver; a first pole of the first transistor and a second pole of the second transistor are connected to the electrical energy storage unit; a second pole of the first transistor is grounded; and a first pole of the second transistor is connected to an output terminal of the analog reference voltage unit; and wherein the gate driver is configured to control, according to the pulse signal, the first transistor and the second transistor to be alternately turned on to output the corresponding analog reference voltage signal.

9. The drive module of claim 1, wherein the power supply chip further comprises a positive power supply voltage unit and a negative power supply voltage unit, wherein the positive power supply voltage unit is connected to the pulse signal generation unit, and the negative power supply voltage unit is connected to the pulse signal generation unit;

the positive power supply voltage unit is configured to generate and output a corresponding positive power supply voltage signal according to the pulse signal; and the negative power supply voltage unit is configured to generate and output a corresponding negative power supply voltage signal according to the pulse signal.

10. A display device, comprising a drive module, wherein the drive module comprises:

an electrical energy storage unit, which is configured to supply power;

an electricity quantity detection unit, which is connected to the electrical energy storage unit and is configured to detect an output voltage of the electrical energy storage unit in real time;

a drive chip, wherein the drive chip comprises a main control unit and a pulse signal generation unit; wherein the electricity quantity detection unit, the main control unit and the pulse signal generation unit are sequentially connected; wherein the main control unit is configured to determine, according to the output voltage of the electrical energy storage unit, an optimal analog reference voltage output efficiency value of a power supply chip, determine, according to the output voltage of the electrical energy storage unit and the optimal analog reference voltage output efficiency value of the power supply chip, a voltage value of an analog reference voltage, and generate, according to the voltage value of the analog reference voltage, a control instruction comprising corresponding pulse signal information; and wherein the pulse signal generation unit is configured to generate, according to the control instruction, a corresponding pulse signal; and the power supply chip, which comprises an analog reference voltage unit, wherein the analog reference voltage unit is connected to the pulse signal generation unit and the electrical energy storage unit; and wherein the analog reference voltage unit is configured to receive an electrical signal output by the electrical energy storage unit, generate, according to the pulse signal, a corresponding analog reference voltage signal, and output the analog reference voltage signal to the drive chip.

11. The display device of claim 10, wherein the electrical energy storage unit is a battery.

12. The display device of claim 10, wherein the electricity quantity detection unit is an electricity quantity detection chip, and both the electricity quantity detection chip and the electrical energy storage unit are located on a main board.

13. A voltage generation method of a drive module, comprising:

detecting, by an electricity quantity detection unit, an output voltage of an electrical energy storage unit in real time;

determining, by a main control unit in a drive chip according to the output voltage of the electrical energy storage unit, an optimal analog reference voltage output efficiency value of a power supply chip; determining, according to the output voltage of the electrical energy storage unit and the optimal analog reference voltage output efficiency value of the power supply chip, a voltage value of an analog reference voltage; and generating, according to the voltage value of the analog reference voltage, a control instruction corresponding to pulse signal information;

generating, by a pulse signal generation unit, a corresponding pulse signal according to the control instruction; and receiving, by an analog reference voltage unit in the power supply chip, an electrical signal output by the electrical energy storage unit, generating, according to the pulse signal, a corresponding analog reference voltage signal, and outputting the analog reference voltage signal to the drive chip.

14. The voltage generation method of claim 13, wherein the detecting, by the electricity quantity detection unit, the output voltage of the electrical energy storage unit in real time comprises:

providing, by a gamma voltage generation circuit, a plurality of dynamically changing voltage signals in real time;

comparing, by a comparator, the voltage signals and an output voltage of the electrical energy storage unit in real time; and outputting, by a voltage interval determination unit, the output voltage of the electrical energy storage unit, wherein the output voltage of the electrical energy storage unit is between two of the voltage signals corresponding to adjacent two different output values of the comparator.

15. The voltage generation method of claim 13, after determining the voltage value of the analog reference voltage, further comprising:
- determining, by the main control unit according to the voltage value of the analog reference voltage, a relevant relationship between basic voltages and a preset value of part of the basic voltages, a voltage multiplying coefficient of a basic voltage relation; calculating and obtaining, according to the voltage value of the analog reference voltage, the relevant relationship between the basic voltages and the voltage multiplying coefficient, an actual output value of each of the basic voltages; and generating instruction information comprising the actual output value; and
- generating, by a basic voltage generation unit of the drive chip, a respective basic voltage according to the instruction information.

16. The voltage generation method of claim 13, wherein the generating, by the pulse signal generation unit, the corresponding pulse signal according to the control instruction comprises:
- generating, by the pulse signal generation unit, a corresponding pulse signal according to information about a number of continuous pulses in the control instruction.

17. The voltage generation method of claim 16, wherein the receiving, by the analog reference voltage unit in the power supply chip, the electrical signal output by the electrical energy storage unit and generating, according to the pulse signal, the corresponding analog reference voltage signal comprises:
- converting, by a digital to analog converter in the analog reference voltage unit, the pulse signal in a digital form into a pulse signal in an analog form;
- generating, by a PWM (Pulse Width Modulation) controller in the analog reference voltage unit, a pulse signal having a corresponding duty cycle based on the pulse signal in the analog form; and
- controlling, by a gate driver of the analog reference voltage unit, according to the pulse signal having the corresponding duty cycle, a first transistor and a second transistor in the analog reference voltage unit to be alternately turned on to output the corresponding analog reference voltage signal.

18. The voltage generation method of claim 13, wherein the generating, by the pulse signal generation unit, the corresponding pulse signal according to the control instruction comprises:
- generating, by the pulse signal generation unit, a corresponding pulse signal based on information about a duty ratio of the pulse signal in the control instruction.

19. The voltage generation method of claim 18, wherein the receiving, by the analog reference voltage unit in the power supply chip, the electrical signal output by the electrical energy storage unit and generating, according to the pulse signal, the corresponding analog reference voltage signal comprises:
- controlling, by a gate driver of the analog reference voltage unit, a first transistor and a second transistor in the analog reference voltage unit to be alternately turned on according to the pulse signal, to output the corresponding analog reference voltage signal.

20. The voltage generation method of claim 13, after generating, by the pulse signal generation unit, the corresponding pulse signal according to the control instruction, further comprising:
- generating and outputting, by a positive power supply voltage unit of the power supply chip, a corresponding positive power supply voltage signal according to the pulse signal; and
- generating and outputting, by a negative power supply voltage unit of the power supply chip, a corresponding negative power supply voltage signal according to the pulse signal.

* * * * *